US012379581B2

(12) United States Patent
Ohrt et al.

(10) Patent No.: US 12,379,581 B2
(45) Date of Patent: Aug. 5, 2025

(54) SYSTEM AND METHOD FOR MONITORING OF STATES OF COMPONENTS OF A MICROSCOPE

(71) Applicant: Carl Zeiss Microscopy GmbH, Jena (DE)

(72) Inventors: Thomas Ohrt, Golmsdorf (DE); Daniel Haase, Zöllnitz (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 0 days.

(21) Appl. No.: 18/487,032

(22) Filed: Oct. 13, 2023

(65) Prior Publication Data

US 2024/0061230 A1 Feb. 22, 2024

Related U.S. Application Data

(63) Continuation of application No. 17/355,397, filed on Jun. 23, 2021, now Pat. No. 11,852,797.

(30) Foreign Application Priority Data

Aug. 20, 2020 (DE) .......................... 102020210595.2

(51) Int. Cl.
*G02B 21/00* (2006.01)
*G02B 21/36* (2006.01)
*G02B 27/01* (2006.01)

(52) U.S. Cl.
CPC ....... *G02B 21/365* (2013.01); *G02B 21/0016* (2013.01); *G02B 21/368* (2013.01); *G02B 2027/014* (2013.01)

(58) Field of Classification Search
CPC .............. G02B 21/365; G02B 21/0016; G02B 21/368; G02B 2027/014; G01M 11/02
See application file for complete search history.

(56) References Cited

U.S. PATENT DOCUMENTS 5,275,553 A * 1/1994 Frish ....................... F23N 5/003
250/339.04
6,000,612 A * 12/1999 Xu ..................... G06K 7/10722
235/462.11

(Continued)

FOREIGN PATENT DOCUMENTS

DE 100 05 213 8/2001
DE 10 2005 024 867 10/2006

(Continued)

OTHER PUBLICATIONS

German Search Report for Application No. 10 2020 210 595.2, mailed Nov. 26, 2020.

*Primary Examiner* — Frank F Huang
(74) *Attorney, Agent, or Firm* — NIXON PEABODY LLP; Jeffrey L. Costellia

(57) ABSTRACT

System for state monitoring of a microscope the system having at least one measuring sensor in each case for capturing at least one time-variable chemical and/or physical quantity, a camera for recording an image in a field of view and a processing unit. The at least one measuring sensor has a display area and displays thereon a measured value for the captured time-variable chemical and/or physical quantity. The camera is arranged so that the display areas of at least one measuring sensor are located in the field of view and the processing unit is configured to evaluate the image and to extract the display areas contained in the image therefrom. Also, a method for state monitoring of a microscope is disclosed, wherein at least one measuring sensor with a display area is provided in order to capture in each case at least one time-variable chemical and/or physical quantity, and an image is recorded. The image is recorded so that it contains the display areas of at least one measuring sensor. The display areas are identified in the image, the image is (Continued)

evaluated and the measured values contained in the image are extracted.

24 Claims, 3 Drawing Sheets

(56) References Cited

U.S. PATENT DOCUMENTS

| | | | | |
|---|---|---|---|---|
| 2003/0151810 | A1* | 8/2003 | Haisch | H04N 13/211 359/464 |
| 2003/0152145 | A1* | 8/2003 | Kawakita | H04N 7/088 348/E7.086 |
| 2005/0243171 | A1* | 11/2005 | Ross | H04N 7/18 348/148 |
| 2008/0148877 | A1* | 6/2008 | Sim | G01D 4/008 73/866.1 |
| 2009/0131811 | A1* | 5/2009 | Morris | A61B 5/091 600/538 |
| 2012/0062615 | A1* | 3/2012 | Van Lier | G09G 3/3466 345/208 |
| 2012/0090757 | A1* | 4/2012 | Buchan | G06F 21/32 156/60 |
| 2013/0141558 | A1* | 6/2013 | Jeon | G01J 1/0233 250/353 |
| 2017/0234709 | A1* | 8/2017 | Mackie | G01M 3/243 73/861.08 |

FOREIGN PATENT DOCUMENTS

| | | |
|---|---|---|
| DE | 10 2012 110 273 | 5/2013 |
| DE | 10 2018 131 214 | 6/2020 |
| WO | WO 2016/039554 | 3/2016 |

* cited by examiner

SYSTEM AND METHOD FOR MONITORING OF STATES OF COMPONENTS OF A MICROSCOPE

CROSS-REFERENCE TO RELATED APPLICATIONS

This application is a continuation of U.S. Non-Provisional patent application Ser. No. 17/355,397, filed on Jun. 23, 2021, which claims priority to German Patent Application No. 102020210595.2, filed on Aug. 20, 2020, which are hereby incorporated by reference herein in their entireties.

The present invention relates to a system for state monitoring of a microscope, the system having at least one measuring sensor, in each case for capturing at least one time-variable chemical and/or physical quantity, a camera for recording an image in a field of view, and a processing unit. Furthermore, the present invention relates to a method for state monitoring of a microscope, wherein at least one measuring sensor is provided, which measuring sensor captures in each case at least one time-variable chemical and/or physical quantity, and an image is recorded.

Approaches of machine learning are known, for example, from the publications Bishop, "Pattern Recognition and Machine Learning", Springer, 2006; Krizhevsky et al.: "ImageNet Classification with Deep Convolutional Neural Networks", NIPS, 2012; Razavian et al.: "CNN Features off-the-shelf: an Astounding Baseline for Recognition", CVPR-Workshops, 2014; Shelhamer et al.: "Fully Convolutional Networks for Semantic Segmentation", IEEE Trans. Pattern Anal, Mach, Intel, 39(4): pp. 640-651, 2017 and Girshick et al.: "Rich feature hierarchies for accurate object detection and semantic segmentation", CVPR, 2014.

Based thereof, a flexible and at the same time simplified monitoring of states of a plurality of optical components of a microscope should be enabled.

The invention is defined in claims 1 and 12 defined. Advantageous further developments are set forth in the dependent claims. The preferred embodiments apply in the same way to the system and the method.

A system for state monitoring of a microscope is provided. The system has at least one measuring sensor, for capturing in each case at least one time-variable chemical and/or physical quantity. The at least one measuring sensor has a display area and displays thereon a measured value for the captured time-variable chemical and/or physical quantity. The system further has a camera for recording an image in a field of view and a processing unit. The camera is arranged so that the display area of at least one measuring sensor is located in the field of view, and the processing unit is configured to evaluate the image and to extract therefrom the measured values displayed on the display areas contained in the image.

At least one measuring sensor is provided in a method for state monitoring of a microscope, said at least one measuring sensor capturing at least one time-variable chemical and/or physical quantity. The at least one measuring sensor has a display area on which a measured value for the at least one time-variable chemical and/or physical quantity is displayed. An image is recorded. The image is recorded so that it contains the display areas of at least one measuring sensor. The image is evaluated and the measured values displayed on the display areas contained in the image are extracted.

The measuring sensors measure at least one time-variable chemical and/or physical quantity of optical or mechanical components in the microscope or its surroundings and display the measured value either directly or in the form of values or data derived therefrom. In this case, the captured time-variable chemical and/or physical quantity can apply directly to the component or have a direct effect on it. For example, information can be output on the display areas as "ready", "suboptimal", or "not usable". The measuring sensors can be attached to all components of the microscope, such as, for example, to the lens and/or to the stage, but also on a sample carrier, an incubator or the like. Also, an attachment of measuring sensors associated with one or more optical or mechanical components, for example for measuring a temperature, a humidity, a brightness or a vibration, is possible. Preferably, the temperature, a $CO_2$ content, an $O_2$ content, a pressure, a pH value, a humidity, an exposure to light and/or a filling level is measured at or near the component. Also, the measurement of other time-variable chemical and/or physical quantities is possible.

For example, thermochromic test strips, pH test strips, etc. are used as measuring sensors. In principle, the user is free to choose the measurement sensors; however, the measurement sensor used must display the value or the derived value or the data in an externally identifiable manner on a display area. The measured value can be displayed directly on the display areas, but a coded display, e.g. as a scale, color code, or in grayscale is also possible. This is achieved by designing the measuring sensor as a thermochromic element, or by providing the measuring sensor with an analog or digital display area. Thermochromic elements change their color when the temperature changes.

The system can also be used for fluorescence microscopes.

The camera, which is provided in the system, has a field of view from which it records an image. A camera, which is already present on the microscope, can also be used; a motor-controlled pivotable camera, that is to say motor-controlled image adjustment, is also conceivable. The camera is aligned with the display areas of the measurement sensors in such a way that the display area(s) of the at least one measurement sensor lies/lie in the field of view and/or the pivoting range. It records an image of the display area(s) once, continuously or at specific times. The type and nature of the camera are irrelevant as long as the display areas and thus the information to be captured are contained in the image. Several cameras are also possible; as far as reference is made to a camera below, this is purely exemplary.

In the image, however, not only the relevant information of the display areas is contained, but also other elements, such as, for example, parts of the microscope, which are not of interest for monitoring because they do not have any display areas that would have to be evaluated. To evaluate the image recorded by the camera, the processing unit is configured in such a way that it identifies the display areas contained in the image by identifying them and extracting the area itself or the displayed value. Optionally, the display areas contained in the image can be identified locally and used to support the evaluation.

In a preferred embodiment, the processing unit or the method is configured in such a way that the display areas are filtered from the image and joined together to form an overall image, for example by stitching. In this way, the measurement results of the measurement sensors are visible at a glance.

The filtering out of the display areas can be supported manually in an initial setup by a learning step in which the display areas in the image are manually defined. In this case, it is possible for the user, for example, to specify the location of each display area in the image and/or the component relevant for the display area.

In a further preferred embodiment, the processing unit or the method is configured to read out the measured values from the display areas of the measuring sensors by means of text and/or image analysis. For example, the image analysis is divided in steps. First, the display areas in the image are identified and found by the processing unit. Subsequently, optionally, the type of each measuring sensor (manufacturer, model, etc.) is identified based on the image. In a further step, the measured value displayed on the display area of the measuring sensor is identified and assigned to a chemical and/or physical quantity and/or component.

A data connection between the measuring sensors and the processing unit can preferably be dispensed with both in the system and in the method. The camera only needs to be connected to the processing unit for image data exchange, which means that cost-effective measuring sensors can be used and the measuring sensors can be used flexibly on different components on the microscope or in proximity of the components of the microscope, and assembly can be cost-effective. In addition, the option of retrofitting an existing system is much easier to implement.

Since the measuring sensors in the system only have to show the measured value on their display area, very simple measuring sensors can be used. Preferably, the measuring sensors have an internal energy source and do not need any supply connections. In a preferred embodiment of the system, the measuring sensors are formed as passive sensors, that is to say sensors that do not require any electrical energy, or as modules with an internal energy supply, such as, for example, battery-operated modules and/or modules with a rechargeable battery. Compared to controlled probes or measuring sensors, which would have to be specially designed for the respective measured quantity and the measuring location, these measuring sensors are extremely inexpensive and ensure considerable cost savings.

In a preferred embodiment of the system, the processing unit has a memory in which measured values are provided with a time stamp and are stored. In a preferred embodiment of the method, the measured values are provided with a time stamp and stored. In doing so, the temporal evolution of measured values can be traced accurately. In addition, the current measured values can be compared at any time with the same measured values at other times.

In a preferred embodiment of the system or the method, a display device is provided on which the extracted display areas and/or measured values are displayed. In this case, the display device is preferably formed as a warning device by means of which the system, controlled by the processing unit, signals an overshooting or undershooting of fixed measured values to the user.

It is also preferred if the results of the extraction of the measured values displayed in the display areas are transmitted to a control loop and/or a workflow, where they are used to control a process, to readjust a process and/or to carry out the workflow. For example, the measured values can be used to automatically readjust the temperature in the examination setup.

In a preferred embodiment an illumination source is provided, which illuminates several of the display area(s) of the at least one measuring sensor, preferably all. Illumination of the display area(s) increases the visibility of the measured values which are displayed on the display areas of the measuring sensors.

In a further preferred embodiment of the system, the processing unit works with an algorithm which develops further through machine learning. In a preferred embodiment of the method, an algorithm is further developed by means of machine learning. Deep learning in particular is used as a method of machine learning. In the processing unit, a model is developed once which, based on a learning algorithm, is able to learn from input data, i.e. in this case the image, to extract the display areas of the measurement sensors and thus also the information depicted on them automatically.

In a training step, one image in each case is linked to an expected result. For example, an image from a thermochromic measuring sensor is linked to the value "52° C.". After the training step, the model is then used to extract the value from the image. In doing so, variations in the image, such as lighting, other components etc. are considered, when there are also relevant variations that could significantly affect the image, in the training step. In the training step, the system then learns to deal with the variations or to suppress the variations when the relevant information is extracted from the image.

The initial setup in the training step can also be supported manually by the user manually defining the display areas in the image. Pre-trained models are conceivable for the user, but also the inclusion of training data for own measuring sensors by the user is possible, based on which he/she himself/herself trains a model for reading out. Furthermore, it is also possible for the images of the measurement sensors recorded by the user to be collected centrally in order to train improved models for reading out. The models can be used both for partial steps, such as the localization of the measuring sensors in the image, the identification of measuring sensor types, or the identification of measured values on the display areas, as well as for an overall step from the recorded image to the readout measured value.

The automatic image analysis of the system represents a significant advance over the classical image processing. In the classical image processing an expert must provide a special algorithm for each type of measuring sensor, and possible variations in the image caused by the camera position, other components of the microscope system, ambient light, etc., can lead to problems. This means a great deal of development effort even for a small number of different types of measurement sensors. If additional measuring sensor types are to be supported, the algorithm must be expanded by an expert. By using machine learning the extensibility of the system is improved. In order to include new types of measuring sensors, data has to be included in machine learning and the model has to be retrained, but the design of the model and the learning algorithm remain unchanged. In addition, the machine learning methods significantly improve the quality of the results compared to traditional image processing methods. Machine learning also increases the speed, as deep learning techniques can calculate responses in real time, even for complex tasks. In addition, continuous learning is made possible by the collection of further, improved data, without an image processing algorithm designed by experts, which is associated with a high workload.

In a preferred embodiment of the method for state monitoring of the microscope, a measured value is assigned to a display area manually, that is to say directly by the user, and is displayed on the display device.

The invention is explained in more detail below by way of example with reference to the drawing. In the drawing.

Figure 1:
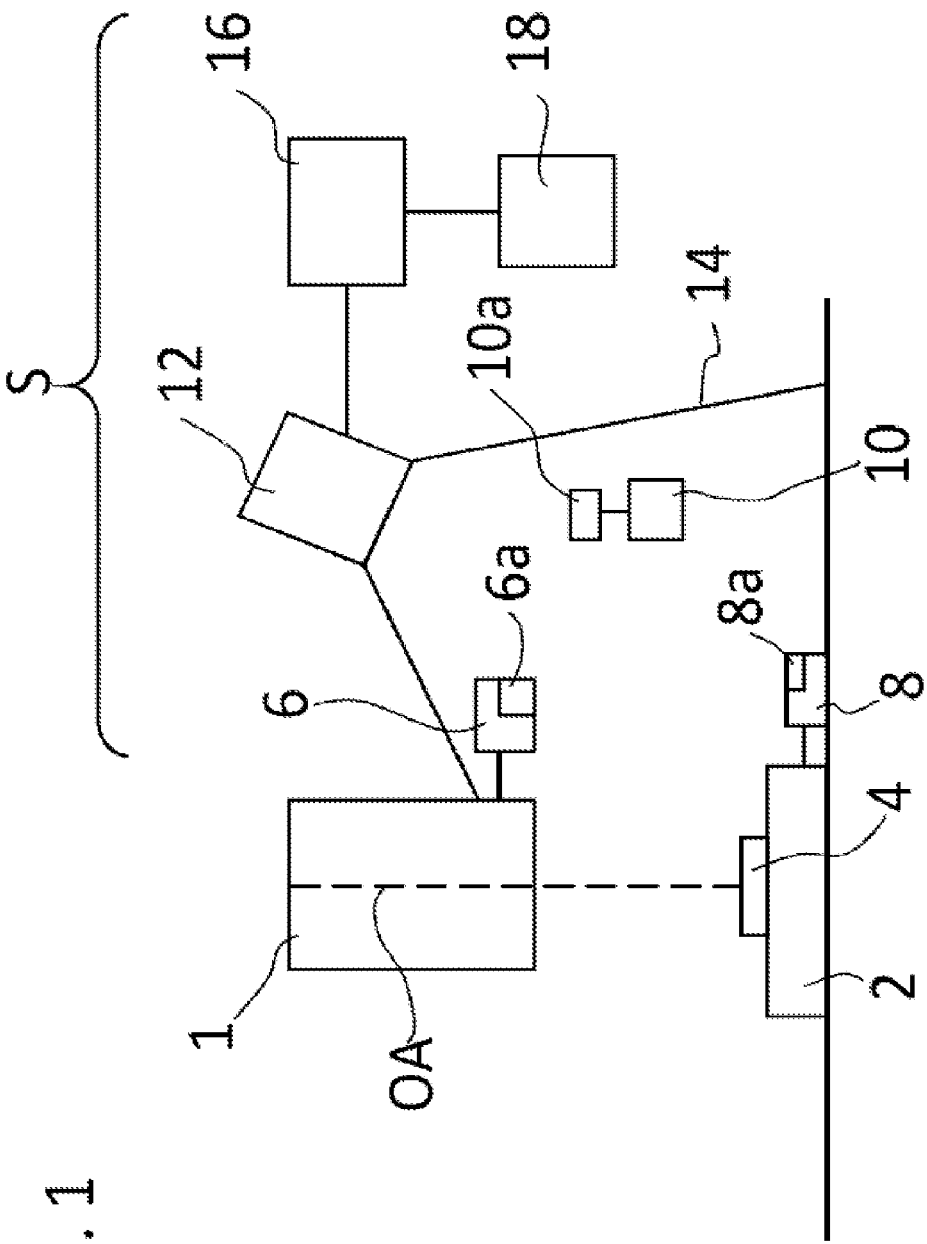
FIG. 1 shows an illustration of a system for state monitoring of a microscope.

FIG. 1 illustrates schematically a system S for state monitoring of a microscope. Along an optical axis OA, a microscope 1 with a lens (not shown separately), captures a sample 4 located on sample carrier 2. A temperature sensor 6 with a display area 6a is arranged on the lens. Display area 6a is formed as a temperature display device which displays the temperature of the lens. Furthermore, a pH sensor 8 with a display area 8a is attached to sample carrier 2. Display area 8a is provided as a color field on the pH sensor and shows a change in the pH value of a component, for example of sample 4, by means of color coding. Furthermore, a further temperature sensor 10 with a display area 10a is provided near sample 4. On the temperature sensor, display area 10a is depicted an external temperature display device which, for example, displays the temperature of the environment near the sample in a scaled manner. All display areas 6a, 8a, 10a are located in a field of view 14 of a camera 12. Camera 12 is connected with a processing unit 16, which feeds a display device 18.

Temperature sensor 6 captures at least one time-variable chemical and/or physical quantity. In the case of using temperature sensor 6, as is the case in FIG. 1, the time-variable chemical and/or physical quantity is the temperature of the lens. The measuring sensor can be formed as a thermochromic element which changes its color on display area 6a or has a temperature display 6a on which a measured value is displayed directly. Other ways of visualizing the measurement of the time-variable chemical and/or physical quantity are also conceivable. It is important in this case only that the outer appearance of the display area of the measuring sensor permits to draw conclusions about the captured measured value, in the case of temperature sensor 6, about the temperature.

pH sensor 8 is attached to sample carrier 2. Said pH sensor 8 is used to measure a time-variable chemical and/or physical quantity on the sample carrier, in this case the pH value. In this case it is also possible to form the measuring sensor as a thermochromic element. Another display area 8a may be provided for visualization of the measurement result, so that the display area of the measuring sensor permits to draw conclusions about a measured value, in this case, the pH value. Coding based on a color field is possible here as a display area, for example. Furthermore, a temperature sensor 10 is provided in the system according to FIG. 1. Said temperature sensor 10 also has a display area 10a that displays the measured value. In this case, it is formed as a temperature display 10a externally to temperature sensor 10.

All three measuring sensors 6, 8, 10 are not connected to the processing unit 16 for the exchange of measured values. They can be formed, for example, as passive sensors or as modules with an internal energy supply, such as battery-operated modules or modules with rechargeable batteries. Display areas 6a, 8a, 10a of all the measuring sensors 6, 8, 10 are located within field of view 14 of camera 12. Camera 12 is formed and positioned suitably for this purpose. Monitoring of the measuring sensors 6, 8, 10 is ensured continuously or at specific times.

An overview camera attached specifically to monitor display areas 6a, 8a, 10a, but also a camera that is already otherwise present on the system, can be used as camera 12. In this case said camera is aligned in such a way that all display areas 6a, 8a, 10a are located within field of view 14. The type and nature of the camera is irrelevant in this case as long as the display areas to be analyzed are visible in the images.

Camera 12 is connected to the processing unit 16 for the exchange of image data. The camera records images of the display areas 6a, 8a, 10a of the measuring sensors 6, 8, 10 continuously or at certain times and transmits them to processing unit 16. In addition to display areas 6a, 8a, 10a, there are also other components that are irrelevant for monitoring in each image. Processing unit 16 evaluates each recorded image by means of image analysis in order to capture the values displayed on display areas 6a, 8a, 10a of measuring sensors 6, 8, 10. In exemplary embodiments, this includes an image analysis with the following steps: finding the display areas 6a, 8a, 10a of the measuring sensors 6, 8, 10 in the image, optionally identifying the type of measuring sensor (manufacturer, model, etc.) and then identifying the measured value for each measuring sensor 6, 8, 10. The values are displayed on display device 18. In exemplary embodiments, display areas 6a, 8a, 10a can be read out by processing unit 16 by means of text and/or image analysis. In modifications, display areas 6a, 8a, 10a contained in the image are extracted from the image and joined together to form an overall image in a stitching process. The overall image then consists of display areas 6a, 8a, 10a lined up next to one another, wherein all of the components that are not relevant for monitoring, but which are contained in the image, are not included in the overall image. The overall image is then displayed on the display device 18.

Figure 2:
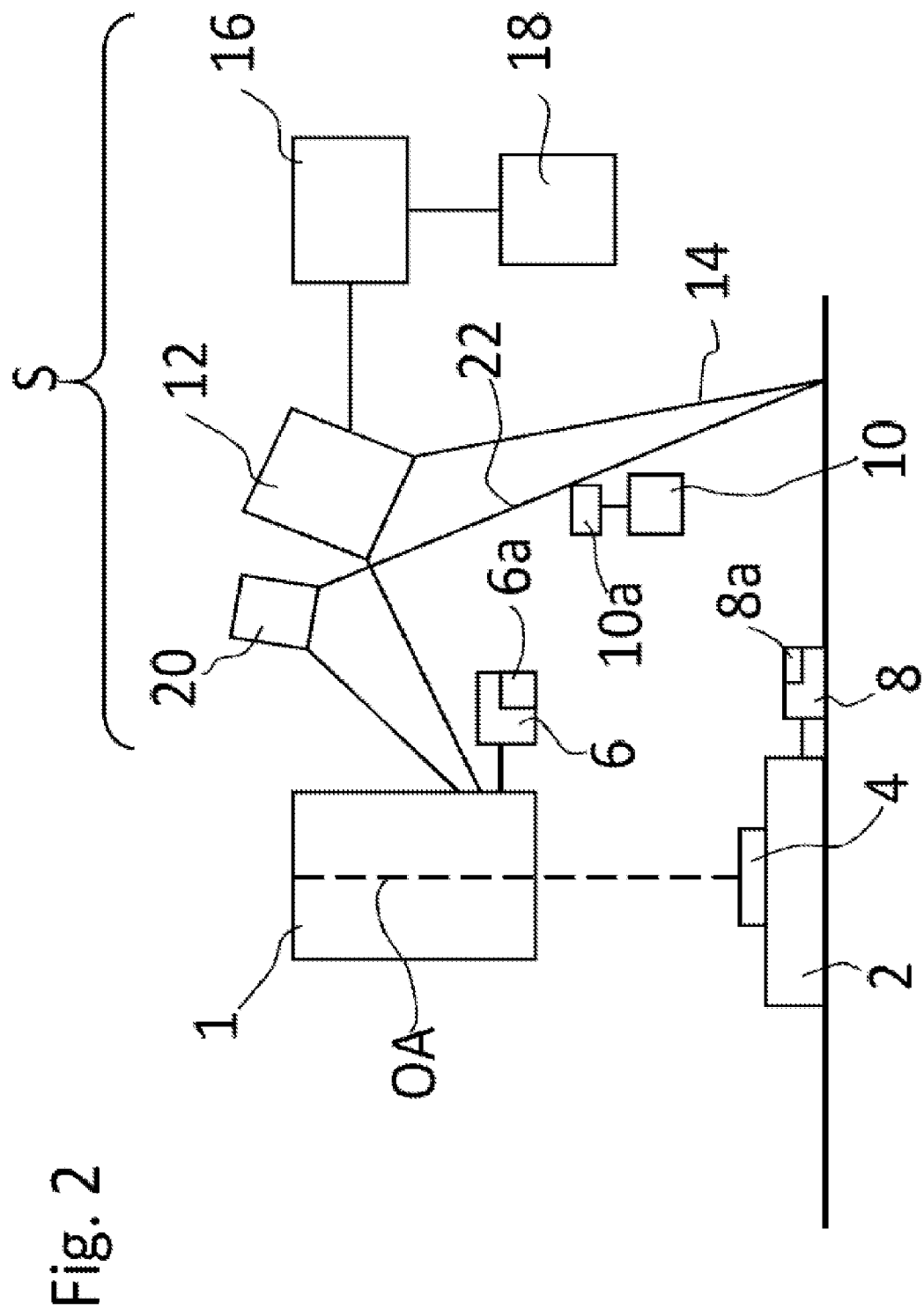
FIG. 2 shows an illustration of a system for state monitoring of a microscope with illumination.

As FIG. 1, FIG. 2 illustrates the system S for state monitoring of a microscope schematically. It addition to the system of FIG. 1 it has an illumination source 20, which produces an illumination field 22. Display areas 6a, 8a, 10a of measuring sensors 6, 8, 10 are actively illuminated with illumination source 20 in order to be independent of ambient light, for example.

Figure 3:
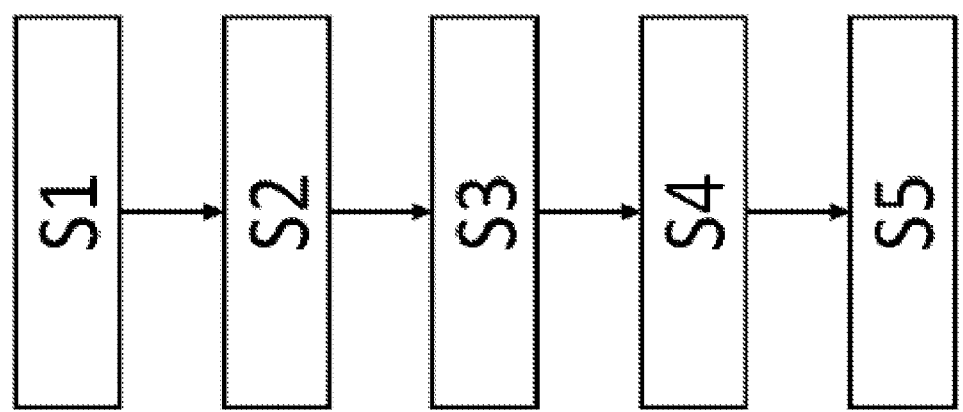
FIG. 3 shows a flow chart of a method for state monitoring of a microscope.

FIG. 3 illustrates a flow chart of the method for state monitoring of a microscope. It consists of steps S1 to S5.

In a step S1, measuring sensors 6, 8, 10 capture at least one time-variable chemical and/or physical quantity of a microscope. Each measuring sensor 6, 8, 10 has a display area 6a, 8a, 10a. The time-variable chemical and/or physical quantities can be, for example, the temperature, the CO2 content, the O2 content, the pressure, the pH value, the humidity, the exposure to light and/or the filling level. In a step S2, the measured, time-variable chemical and/or physical quantities are displayed on display areas 6a, 8a, 10a of measuring sensors 6, 8, 10. The image is recorded either continuously or at specific times in a step S3. In a step S4, the image is evaluated by processing unit 16. For this purpose, processing unit 16 preferably works with automatic image analysis, wherein first display areas 6a, 8a, 10a are found in field of view 14 and identified locally and then, optionally, the type of measuring sensor (manufacturer, model, etc.) is identified before the displayed measured value is identified for each identified display area 6a, 8a, 10a. The results of the automatic image analysis in step S4 are finally displayed on display device 18 in a step S5.

In modifications, display device 18 is formed as a warning device. Measured values are defined, the overshooting or undershooting of which is identified by processing unit which then warns the user. For this purpose, display device 18 is activated by processing unit 16, which provides a warning signal to the user.

In modifications, processing unit 16 is connected to a memory. The measured values are provided with a time stamp by processing unit 16 and stored in the memory. The stored measured values can then be retrieved by processing unit 16 at any time.

In a further exemplary embodiment, it is possible for the user to specify a measured value of display areas 6a, 8a, 10a manually, which is displayed on display device 18.

Several possibilities have been described by means of which processing unit 16 can read out the measured values from display areas 6a, 8a, 10a and extract them from the image. Processing unit 16 works with an algorithm when carrying out the extraction. In modifications this algorithm is further developed using machine learning. Deep learning in particular is used as a method of machine learning. In the processing unit, a model is developed once which, based on a learning algorithm, is able to learn from input data, i.e. the image in this case, to extract display areas 6a, 8a, 10a of measuring sensors 6, 8, 10 and thus also the information displayed on it automatically.

LIST OF REFERENCE NUMERALS

1 Microscope
2 Sample carrier
4 Sample
6 Temperature sensor
6a Display area
8 pH sensor
8a Display area
10 Temperature sensor
10a Display area
12 Camera
14 Field of view
16 Processing unit
18 Display device
20 Light source
22 Illumination field
OA Optical axis
S1 Step 1
S2 Step 2
S3 Step 3
S4 Step 4
S5 Step 5

The invention claimed is:

1. A system for state monitoring of a microscope, the system having:
at least one measuring sensor in each case for capturing at least one time-variable chemical and/or physical quantity associated with the microscope, associated with an environment of the microscope, associated with a sample within an optical axis of the microscope, or a combination thereof,
a camera for recording an image in a field of view, and
a processing unit,
wherein:
the at least one measuring sensor has a display area and displays a measured value thereon for the at least one captured time-variable chemical and/or physical quantity,
the camera is arranged so that the display area of the at least one measuring sensor is located in the field of view,
the processing unit is configured to evaluate the image and to extract therefrom the measured values displayed on the display area contained in the image, and
the processing unit is configured to evaluate the image and extract the measured values using a machine learning model.

2. The system according to claim 1, wherein the at least one measuring sensor is not connected with the processing unit for the exchange of measured values, and the camera is a component of the microscope.

3. The system according to claim 1, wherein the processing unit is configured to filter out the display area contained in the image and to join them together to form an overall image.

4. The system according to claim 1, wherein the processing unit is configured to read out the measured values from the display area by means of text recognition and/or image analysis.

5. The system according to claim 1, wherein the processing unit has a memory in which the measured values provided with a time stamp are stored.

6. The system according to claim 1, wherein a display device is provided which displays the results of the extraction of the measured values displayed in the display area.

7. The system according to claim 6, wherein the display device is formed as a warning device by means of which the system, controlled by the processing unit, signals the overshooting or undershooting of fixed measured values to the user.

8. The system according to claim 1, wherein the results of the extraction of the measured values displayed in the display area are transmitted to a control loop and/or a workflow.

9. The system according to claim 1, wherein the at least one measuring sensor is formed as a passive sensor or as a module with internal power supply.

10. The system according to claim 1, wherein the processing unit is configured to evaluate the image and to extract therefrom information identifying a type of the at least one measuring sensor.

11. The system according to claim 1, wherein the processing unit is configured to evaluate the image to independently determine the location of the display area of the at least one measuring sensor based on machine learning.

12. A method for state monitoring of a microscope, the method comprising:
providing at least one measuring sensor, which in each case captures at least one time-variable chemical and/or physical quantity associated with the microscope, associated with an environment of the microscope, associated with a sample within an optical axis of the microscope, or a combination thereof,
recording an image with a camera,
wherein:
the at least one measuring sensor has a display area and a measured value is displayed thereon for the at least one time-variable chemical and/or physical quantity,
the image is recorded so that it contains the display area of the at least one measuring sensor,
the display areas are identified in the image, and
evaluating the image to extract therefrom the measured values displayed on the display area contained in the image, wherein evaluating the image and extracting the measured values includes using a machine learning model.

13. The method according to claim 12, wherein the at least one measuring sensor is not connected with the processing unit for the exchange of measured values, and the camera is a component of the microscope.

14. The method according to claim 12, wherein the display area contained in the image are filtered out and joined together to form an overall image.

15. The method according to claim 12, wherein the measured values are read out from the display area by means of text recognition and/or image analysis.

16. The method according to claim 12, wherein the measured values are provided with a time stamp and stored in a memory.

17. The method according to claim 12, wherein the results of the extraction of the measured values displayed in the display area are displayed with a display device.

18. The method according to claim 17, wherein an overshooting or undershooting of fixed measured values is signaled to the user by the display device formed as a warning system.

19. The method according to claim 12, wherein the results of the extraction of the measured values displayed in the display area are used in a control loop and/or a workflow.

20. The method according to claim 12, further comprising evaluating the image to extract therefrom information identifying a type of the at least one measuring sensor.

21. The method according to claim 12, further comprising evaluating the image to independently determine the location of the display area of the at least one measuring sensor based on machine learning.

22. The method according to claim 12, wherein a measured value is manually assigned to an optical or mechanical component of the microscope and this measured value is displayed on the display area.

23. The system according to claim 1, wherein the machine learning model is trained at least in part using one or more training images acquired by the camera while the camera is arranged so that the display area of the at least one measuring sensor is located in the field of view.

24. The method according to claim 12, wherein the machine learning model is trained at least in part using one or more training images acquired by the camera while the camera is arranged so that the display area of the at least one measuring sensor is located in the field of view.

* * * * *